W. A. DOBLE.
INTAKE VALVE.
APPLICATION FILED SEPT. 7, 1915.
1,207,002.
Patented Dec. 5, 1916.
3 SHEETS—SHEET 3.
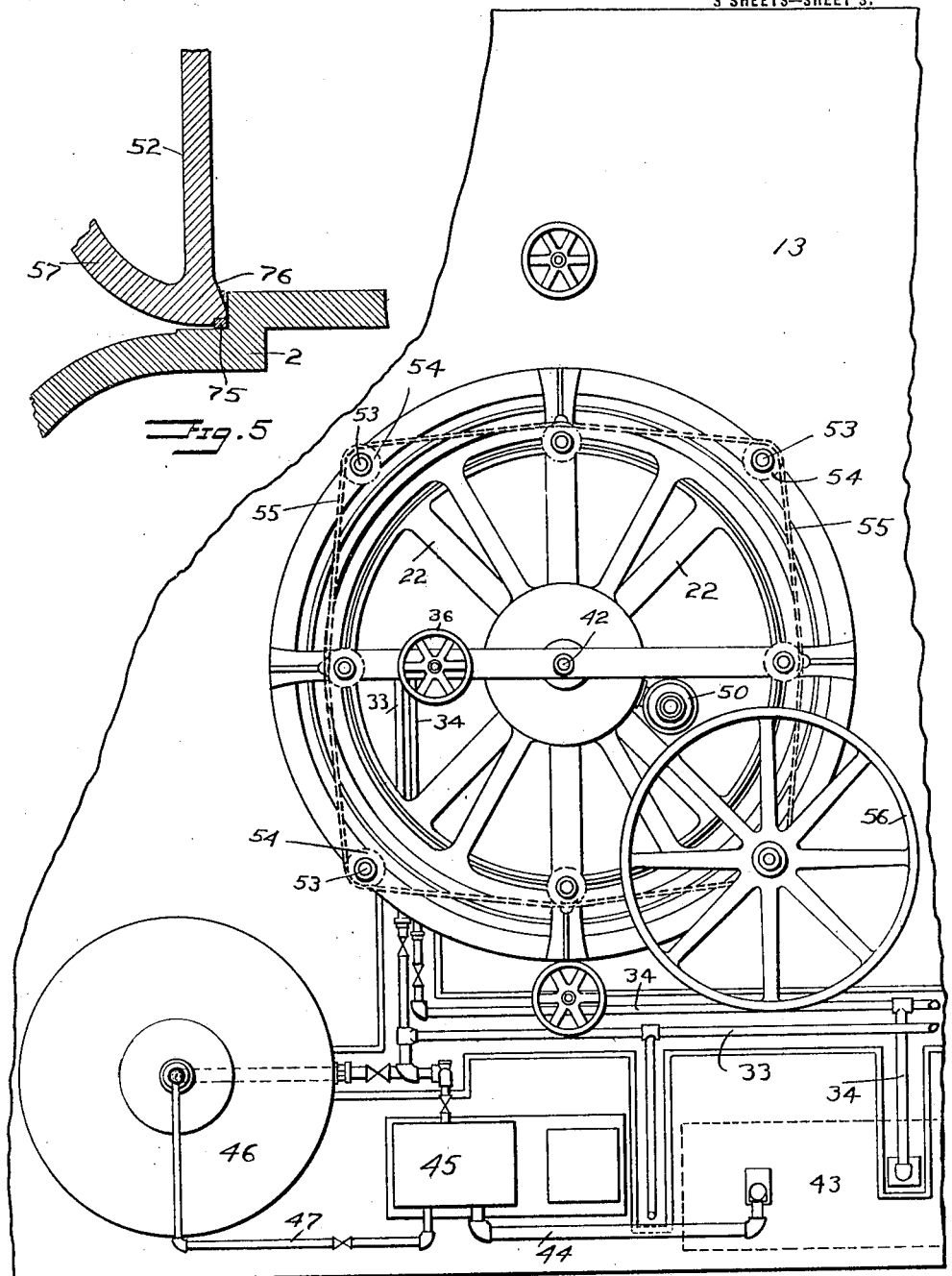
WITNESS
J. H. Morgan
INVENTOR.
WILLIAM A. DOBLE
BY White & Prost
his ATTORNEYS.

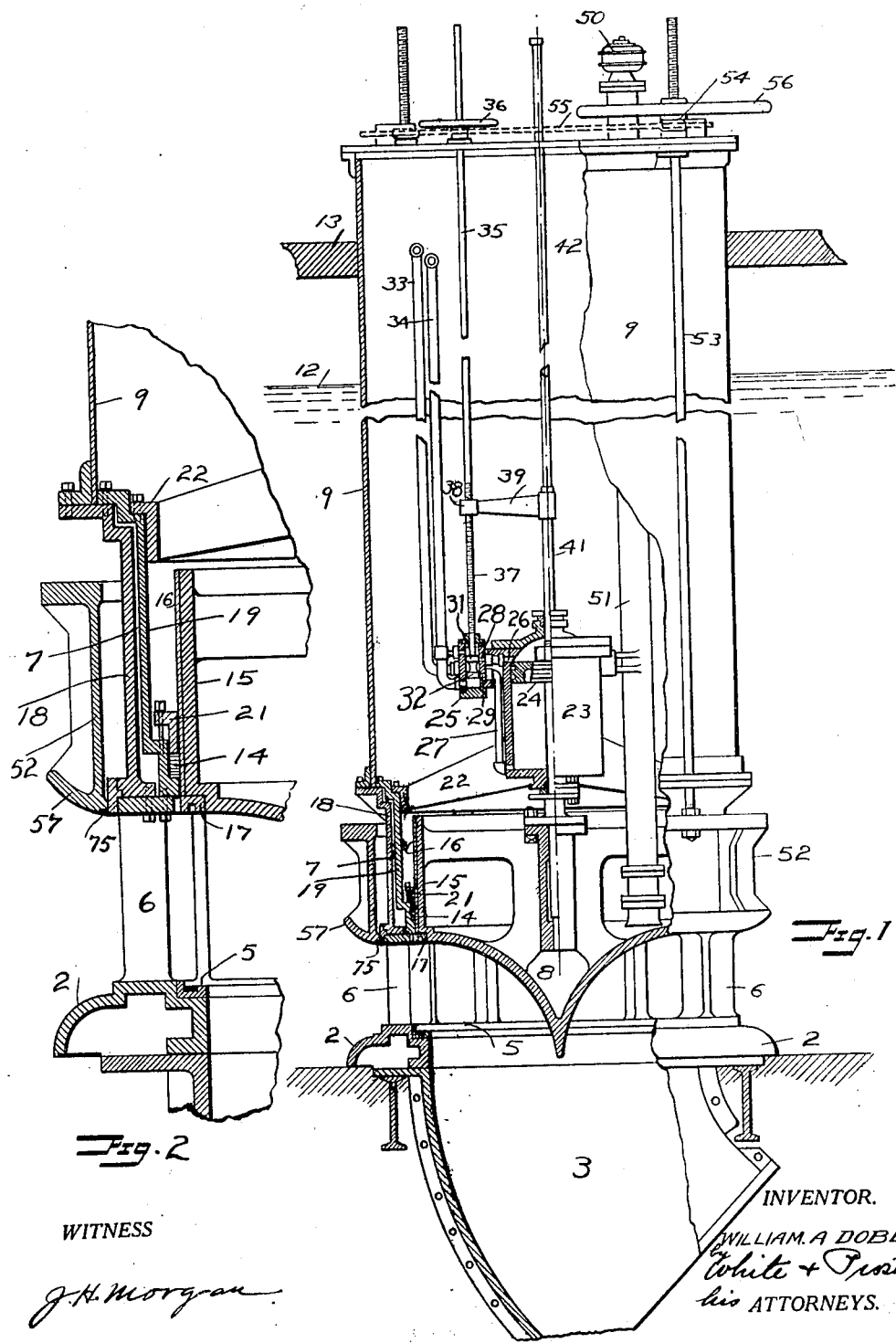

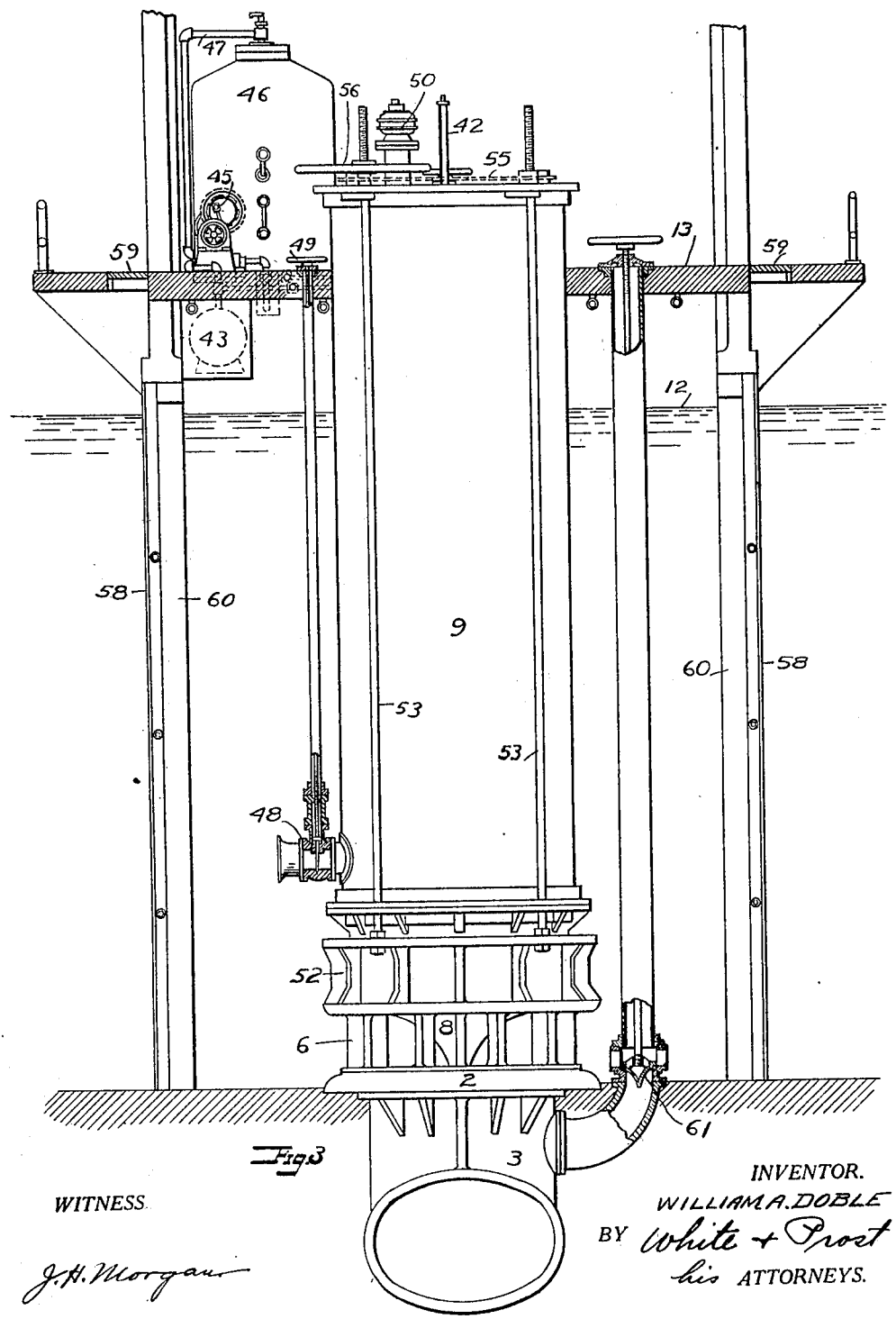

UNITED STATES PATENT OFFICE.

WILLIAM A. DOBLE, OF SAN FRANCISCO, CALIFORNIA.

INTAKE-VALVE.

1,207,002.  Specification of Letters Patent.  Patented Dec. 5, 1916.

Original application filed May 12, 1913, Serial No. 766,947. Divided and this application filed September 7, 1915. Serial No. 49,242.

*To all whom it may concern:*

Be it known that I, WILLIAM A. DOBLE, a citizen of the United States, and a resident of the city and county of San Francisco, State of California, have invented certain new and useful Improvements in Intake-Valves, of which the following is a specification.

This application is a division of application Serial Number 766,947, filed May 12, 1913 in the United States Patent Office, which has matured into Patent 1,169,136, Jan. 25, 1916.

The invention relates to intake valves adapted to control the flow of water from a reservoir or other source into pipe lines or conduits, and more particularly to intake valves which are arranged below the surface of the water.

An object of the invention is to provide an intake valve for governing the flow of water into a pipe line or conduit.

A further object of the invention is to provide a controlling valve which allows the water to enter the conduit with the least disturbance.

A further object of the invention is to provide an auxiliary valve in combination with the needle valve which operates to shut off the flow of water so that the needle and its coacting parts may be readily removed when desirable or necessary.

The invention possesses many other objects and advantageous features, which, with the foregoing, will be set forth at length in the following description, where I shall outline in full that form of the invention which I have selected for illustration in the drawings accompanying and forming part of the present specification. The novelty of the invention will be included in the claims succeeding said description. From this it will be apparent that I do not limit myself to the showing made by such drawings and description, as I may adopt many variations within the scope of my invention as set forth in said claims.

Referring to said drawings, Figure 1 is an elevation of the valve, partly in cross section, part thereof being broken away to reduce the size of the figure. Fig. 2 is a fragmentary cross sectional detail on a larger scale of a portion of the structure. Fig. 3 is an elevation of one valve taken at right angles to the view shown in Fig. 1, showing part of the operating mechanism. Fig. 4 is a plan view of the valve operating mechanism. Fig. 5 is a fragmentary cross sectional detail of the lower part of the cylindrical gate and its seat.

The valve of my invention is particularly adapted to be installed below the surface of the water in the reservoir, or adjacent the bottom thereof, so that advantage may be taken of the head of water in the reservoir, and so that a variation of the level of the water in the reservoir will be substantially immaterial. The valves are designed not only to establish or cut off communication between the conduit and the water supply, but to control the opening, so that the desired amount of water may be obtained. The construction is such that the water enters the conduit or tunnel with the least disturbance, thereby avoiding to a great degree eddy currents and the erosion of the concrete lining of the tunnel. The flow of the water into the tunnel may be controlled by one or more valves, depending upon the amount of water necessary at the power plant or upon other consideration.

The base of each valve is preferably set in concrete for obvious reasons, and is suitably supported and anchored so that it is fixed and practically permanent. Below the base ring 2 is preferably arranged a quarter turn elbow 3 which receives the incoming water and directs it into the tunnel or conduit with the least amount of disturbance, thereby avoiding erosion of the concrete lining. The circular base 2 serves as the main base for the entire construction and also acts as a support for and carries the lower valve seat 5, which is preferably made in the form of a steel ring.

Supported above the base 2 by the columns 6 spaced apart circumferentially is a cylindrical construction 7, upon which the main controlling valve or plate 8 is carried, the valve being preferably formed in the shape of a needle valve. Securely attached to the upper part of the cylindrical construction 7 is a caisson 9 which extends above the level of the water 12 and preferably above the operating platform 13. The joint between the needle 8 and the cylindrical construction 7 is securely packed with a suitable packing 14, held in place by the usual packing gland, thereby preventing the water from entering the caisson, allowing the various parts lying therein to be accessible for inspection or repair.

The main needle 8 is preferably formed hollow and is suitably braced on the interior to withstand the pressure of the water. The body portion 15 of the needle is preferably formed cylindrical in shape and the height of the body is such that the sides thereof engage the packing 14 for all positions of the needle. The body of the needle may be provided with a bronze jacket 16 to prevent corrosion and to maintain a smooth surface in contact with the packing 14, thereby preventing leakage into the interior of the caisson.

The needle is arranged concentrically with regard to the opening on the base plate 2, and operates to guide the water smoothly into the elbow 3. The outer surface of the base plate is also preferably curved to reduce the water disturbance as much as possible. Arranged on the needle, preferably at the periphery thereof, is the upper valve seat 17 which, when the needle is lowered, engages the lower valve seat 5, fixed on the base plate. The lower valve seat ring is provided with a groove in which a special metal is inserted to make a tight replaceable gate seat.

The cylindrical construction 7 consists of the main cylinder 18 which is attached at its lower end to the column 6 and bolted at its upper end to the flange of the caisson 9. Arranged within the cylinder 18 and preferably bolted thereto and spaced apart slightly therefrom, is the cylinder 19 to which is attached the gland 21 for holding the packing 14. The cylinder 19 is usually provided on its upper end with a shoulder against which the frame 22 which supports the needle and its operating mechanism rests and to which it is bolted.

Supported on the frame 22 is a cylinder 23, alined with the axis of the needle, in which the piston 24, connected to the needle, is movable. The movement of the piston 24 is controlled by the valve 25 which is preferably of the sliding piston type. The cylinder 23 is provided with two conductors 26—27 connecting the spaces in the cylinder above and below the piston with the apertures 28—29 in the valve 25. The valve piston of the valve 25 is provided with two heads 31—32 which are adapted to simultaneously close both apertures 28 and 29, thereby locking piston 24 in position. The piston 24 is operated by fluid, preferably oil, under pressure which is introduced into the valve 25 through the conductor 33 into the space lying between the two piston heads 31—32. The oil discharged from the cylinder 23 passes out the valve body 25 through the conductor 34 which connects with the valve body above and below the piston heads 31—32 respectively. An upward movement of the valve piston rod or valve stem 35 will place the upper part of cylinder 23 in communication with the oil supply pipe 33 and the lower part in connection with the exhaust pipe 34, thereby causing the piston 24 to move downward. A downward movement of the valve stem operates similarly to cause an upward movement of the piston 24.

The valve stem 35 extends upward above the level of the operating platform 13 and is provided adjacent its upper end with means for rotating it, such as the hand wheel 36. This rotary motion is converted into a longitudinal motion by means of the screw threaded portion 37 of the valve stem engaging in a screw threaded boss 38, carried by the arm 39. The arm 39 is fixed upon the rod 41 which is secured to and moves with the piston 24, and an indicating rod 42 attached to rod 41 or forming an extension thereof, extends above the operating platform, to indicate the position of the needle.

As the hand wheel 36 is rotated in the proper direction, the valve stem 35, due to its engagement with the boss 38, is moved upward, allowing oil under pressure to enter the cylinder 23 above the piston 24 and allowing the oil in the cylinder below the piston to discharge. The resulting downward movement of the piston, operating through the rod 41 and the arm 39, moves the valve stem 35 downward until the passages 28 and 29 in the valve body are closed. In order to close the needle valve completely the hand wheel 36 must be rotated until the indicating rod shows that the valve is closed. It is evident that for a given rotation of the hand wheel the needle moves a certain distance and is locked in that position, so that the needle valve may be readily set for any desired flow of water. As soon as the needle has moved to the amount provided for by the rotation of the hand wheel, the valve is brought back to the neutral position by the movement of the piston, so that the actual movement of the needle follows exactly the movement of the controlling valve. The screw threaded portion on the valve stem should be a length at least equal to the full stroke of the piston 24, to allow for the travel of the boss 38. By continuously rotating the hand wheel 36 the needle is caused to move continuously, and when the rotation of the hand wheel ceases, the needle is locked in position.

The oil discharged from the cylinder 23 flows through the pipe 34 to the storage tank 43, whence it is drawn through the conductor 44 to the pump 45 and forced into the pressure supply tank 46. The desired pressure is maintained in tank 46 by air, which is pumped in through the pipe 47. All of the various conductors and pipes are provided at suitable points with valves, to control the flow of the fluids. The pressure tank 46 is preferably made of such capacity that in the event of a failure or breaking down of the pumping mechanism, there would be sufficient oil under pressure to allow the operator to close all of the intake valves in the installation. The pressure is preferably derived from a pump operated by an electric motor, which is provided with an automatic pressure control so that the pressure in the tank is automatically maintained substantially constant.

Emergency means are provided for shutting the needle valves, should for any reason the pressure fluid system fail to operate. Arranged in the side of the caisson 9 is an inlet controlled by the gate valve 48, which is operated by the hand wheel 49, arranged on the operating platform. When this valve 48 is opened the caisson fills with water, the weight thereof, operating in conjunction with the weight of the needle, being sufficient to force the needle downward to its seat and close the intake valve. A centrifugal pump, driven by the motor 50, draws water through the pipe 51 arranged within the caisson, thereby providing means for removing any leakage water or any water which has been admitted through valve 48.

The invention contemplates the combination with the needle valve of means for shutting off the supply of water to the needle valve, or for temporarily controlling the supply, when it is desirable or necessary to remove or repair the needle or any of its coacting parts. These parts require repair or replacement at times and when such times occur, the flow of water is shut off or controlled temporarily by a cylindrical gate surrounding the intake to the needle valve, thereby allowing the needle to be removed entirely for the purpose of repair if necessary, without interfering with the flow of water for any material time.

Surrounding the cylindrical construction 7 and preferably guided thereby, is a vertically movable cylindrical gate 52, which is supported on the suspension rods 53. The suspension rods extend upward through the operating platform and are screw-threaded at their upper ends for engagement with the nuts 54. The nuts 54 are formed in the shape of sprocket wheels which are engaged by the chain 55, so that all of the nuts rotate together, thereby causing the cylindrical gate to be raised or lowered evenly. One of the nuts 54 is provided with a hand wheel 56, for operating the gate. The lower edge of the gate 52 is provided with an upwardly curved flange 57, which, when the gate is raised, constitutes an extension of the main needle, forming a smooth surface to guide the water. When the gate is lowered the lower edge thereof engages a seat in the base ring 2, closing the water inlet. The gate 52 is preferably provided on its lower inner edge with a ring 75 which seats against the base ring 2 when the gate is lowered. Means are also provided for tightly sealing the joints between the cylinder gate and the base ring and the cylindrical construction 7 so that all water may be shut out from the interior of the valve and the tunnel when it is necessary or desirable to repair, replace or alter these parts. The inner surface of the gate 52 is formed with in inward taper or inclination 76 adjacent the top and bottom, so that when the gate is closed, a wedge shaped groove is formed between the gate and the base ring and between the gate and the cylindrical construction. Any slight leakage that may occur may be effectively stopped by calking the grooves with oakum or some other fibrous material adapted for that purpose. The grooves or the inclinations of the surface of the gate are preferably formed by forming the bottom and top portions of the gate thicker than the body portion, and by sloping the surface of the body portion inward to meet such thickened portion.

Surrounding the entire valve structure and extending upward above the level of the water is a grillage 58 which operates to prevent sticks, trees and other foreign substances from entering the valve and finding their way into the tunnel and to the hydraulic power apparatus. The operating platform is preferably supported on piers 60 between which the grillage is arranged, and trap-doors 59 are provided in the platform to allow the accumulated trash to be cleared from the grillage.

In order to avoid the inrush of water into the tunnel or conduit when the main valve is initially opened, I provide a supplemental needle valve 61, opening into the conduit, which is opened to allow the conduit to fill before the main valve is opened. This obviates the destructive effect that would be produced should the main valve be opened when the conduit is empty.

I claim:

1. An intake valve adapted to be arranged below the level of a body of water comprising a base ring, an open structure mounted on said base ring, a cylindrical structure arranged on said open structure and adapted to extend above the surface of the water, a needle arranged within said open structure adapted to control the flow of water through said base ring, a cylindrical gate adapted to control the flow of water through said open structure, and means for suspending said gate from the top of said cylindrical structure.

2. An intake valve comprising a base ring, an open structure mounted on said ring, a cylindrical structure arranged above said open structure, a needle arranged within said cylindrical structure adapted to be moved to control the opening in said base ring, a cylindrical gate of larger diameter than said needle adapted to control the flow of water through said open structure, and suspension rods for supporting and operating said gate.

3. An intake valve comprising a base ring, an open structure mounted on said ring, a cylindrical structure arranged above said open structure, a needle valve adapted to be raised and lowered to control the flow of water through said base ring, and a cylindrical gate valve surrounding said cylindrical structure and adapted to be raised and lowered to control the flow of water through said open structure, the lower face of said gate valve being formed with an upwardly flaring flange to form an extension of the lower face of the needle when both are raised.

4. An intake valve comprising a base ring, a cylindrical structure arranged above said base ring, a plurality of columns arranged between said base ring and said structure, a needle valve adapted to control the flow of water through said base ring, a gate valve adapted to control the flow of the water through the spaces between said columns, and means exterior of said cylindrical structure for supporting and operating said gate valve.

5. An intake valve adapted to be arranged below the level of a body of water comprising a base ring, an open structure mounted on said base ring, a cylindrical structure mounted on said open structure and adapted to extend above the level of the water, a needle arranged at the lower end of said cylindrical structure, means for moving said needle to control the flow of water through said base ring, a gate valve, surrounding said cylindrical structure, means for suspending said gate valve from the upper portion of said cylindrical structure, and means for varying the length of said suspending means to control the flow of water through said open structure.

6. An intake valve adapted to be arranged below the level of a body of water comprising a base ring through which water is discharged into a conduit, an open structure mounted on said base ring, a cylindrical structure mounted on said open structure, a caisson secured to said open structure and adapted to extend above the level of the water, a needle having a cylindrical body arranged within said cylindrical structure at the lower end, means for moving said needle to control the flow of water through said base ring, a cylindrical gate surrounding said cylindrical structure, means for suspending said gate from the top of said caisson, and means for moving said suspending means to control the flow of water through said open structure.

7. An intake valve adapted to be arranged below the level of a body of water comprising a base ring through which water is discharged into a conduit, an open sided structure having a top closed against the entrance of water arranged on said base ring, a needle coacting with said base ring to control the flow of water therethrough, a cylindrical gate adapted to control the flow of water through said open sided structure, and rods exterior of said structure for supporting and operating said gate.

8. An intake valve adapted to be arranged below the level of a body of water, comprising a base ring, a plurality of columns spaced apart circumferentially on said ring, a cylindrical structure mounted on said columns, a caisson attached to said structure and adapted to extend above the level of the water, a needle having a cylindrical body arranged within said cylindrical structure, a packing between said structure and the body of said needle, means for moving said needle with respect to the base ring, means for controlling said needle moving means arranged above the level of the water, a cylindrical gate surrounding said cylindrical structure, and guided thereby, adapted to engage said base ring, means for suspending said gate from the top of said caisson, and means arranged above the level of the water for moving said suspending means to control the flow of the water through the spaces between said columns.

9. In an intake valve, a base ring, a needle valve adapted to control the flow of water through said base ring, a cylindrical gate coacting with said base ring, the inner face of said gate being inclined inward adjacent the bottom to coöperate with said base ring to form a tapered annular groove when the gate is in its closed position.

10. In an intake valve, a base ring, a needle valve adapted to control the flow of water through said base ring, a second ring alined with and spaced apart from said base ring and a cylindrical gate adapted to close the opening between said rings, the inner face of said gate being inclined inward adjacent the top and bottom to coöperate with said base ring to form tapered grooves when the gate is in its closed position.

11. An intake valve comprising a base ring, an open structure mounted on said ring, a cylindrical structure arranged above said open structure, a needle arranged within said cylindrical structure adapted to be moved to control the opening in said base ring, a cylindrical gate adapted to control the flow of water through said open structure, means for suspending said gate from the upper portion of said cylindrical structure, and means for allowing water to flow into said cylindrical structure.

12. An intake valve comprising a base ring, an open structure mounted on said ring, a cylindrical structure arranged above said open structure, a needle arranged within said cylindrical structure adapted to be moved to control the opening in said base ring, a cylindrical gate adapted to control the flow of water through said open structure, means for suspending said gate from the upper portion of said cylindrical structure, means for allowing water to flow into said structure and means for exhausting the water from said structure.

In testimony whereof I have hereunto set my hand at San Francisco, California, this 30th day of August, 1915.

WILLIAM A. DOBLE.

In presence of—
H. G. PROST.

Copies of this patent may be obtained for five cents each, by addressing the "Commissioner of Patents, Washington, D. C."